United States Patent [19]

Canfield

[11] 4,005,915
[45] Feb. 1, 1977

[54] PLAIN BEARING

[75] Inventor: Earl H. Canfield, South Euclid, Ohio

[73] Assignee: Wellington Machine Co., Wellington, Ohio

[22] Filed: June 30, 1975

[21] Appl. No.: 592,027

[52] U.S. Cl. .................. 308/36 R; 295/44; 308/114

[51] Int. Cl.² .................. B61F 17/22; B60B 37/10

[58] Field of Search .............. 295/44, 45; 308/114, 308/36, 37, 64, 76, 92, 93, 162

[56] References Cited

UNITED STATES PATENTS

| 977,360 | 11/1910 | Armstrong, Jr. | 308/113 |
|---|---|---|---|
| 1,329,495 | 2/1920 | Binkley | 295/44 |
| 1,475,511 | 11/1923 | Rees | 308/114 |
| 1,882,957 | 10/1932 | Sanford | 295/44 |
| 2,403,397 | 7/1946 | Rankin | 308/93 |
| 2,573,735 | 11/1951 | Sanford et al. | 295/44 |

Primary Examiner—Philip Goodman
Assistant Examiner—Richard A. Bertsch
Attorney, Agent, or Firm—Watts, Hoffmann, Fisher & Heinke Co.

[57] ABSTRACT

A plain bearing and bearing-supported member of hardened steel for high load, low speed, use, especially suitable in wet environments and requiring little or no lubrication. Bearing surfaces are nitrided and steam tempered, and have a low friction, corrosion, and wear resistant oxide surface on a hardened case.

3 Claims, 1 Drawing Figure

U.S. Patent     Feb. 1, 1977     4,005,915
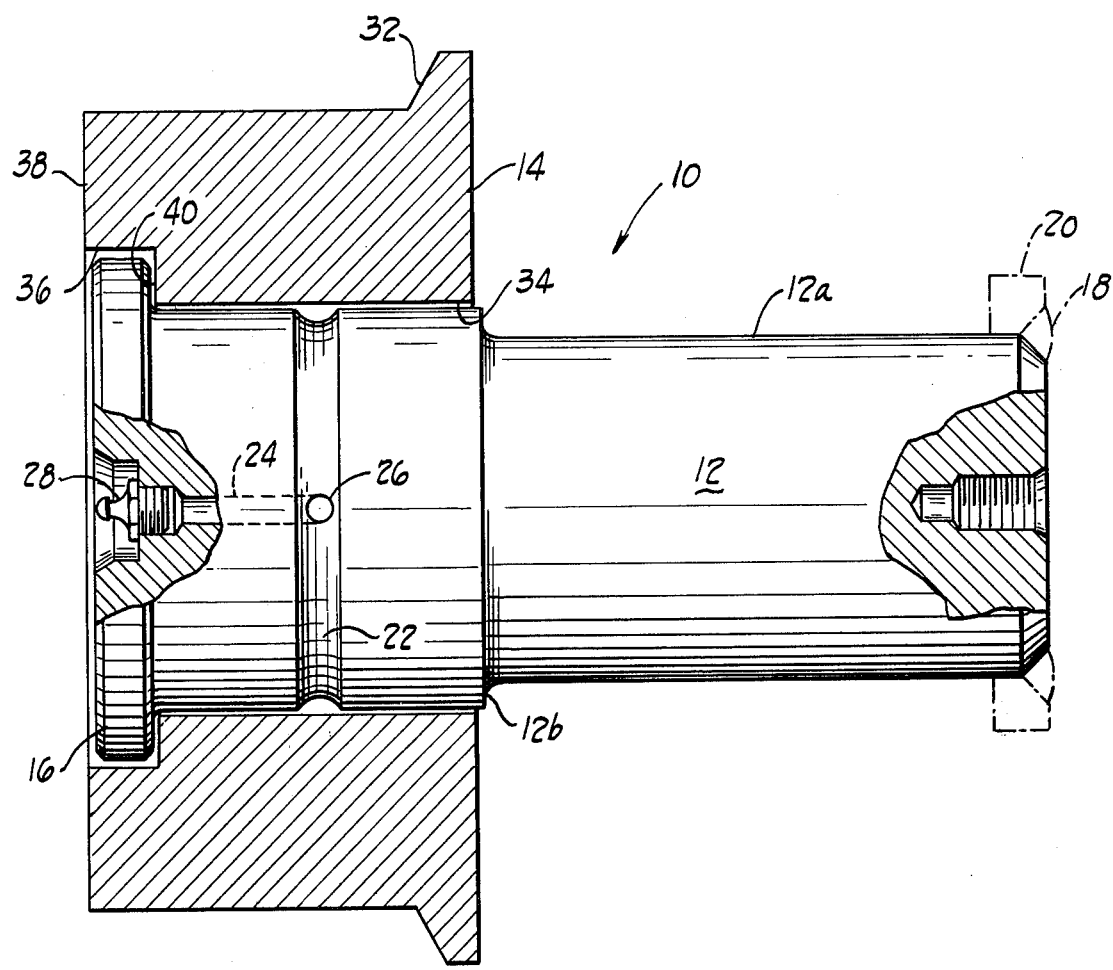

PLAIN BEARING

BACKGROUND OF THE INVENTION

1. Field of the Invention

This invention relates to an improvement in plain bearings.

2. Prior Art

Difficulties arise in providing adequate bearings where heavy loads, including impact loads, must be accommodated in environments that are hostile to lubrication and to the bearing materials, such as wet, dirty, environments. The problem is further accentuated if maintenance is likely to be neglected. This type of situation exists, for example, in the wet environment in which certain machinery is used in steel mills. In particular, a need exists for improved wheel bearings used with work roll chocks of steel finishing mills and roughing mills. Work roll chocks are heavy roll supports on movable trucks that have track-guided wheels. The trucks permit moving the work rolls into and out of a roll stand, and the supporting wheels are subjected not only to heavy loads, but also the dirt, dust and water of the surroundings. A need also exists for improved bearings for conveyor wheels used in industrial environments with heavy loads and at low rotational speeds. In these types of applications, particularly with wheels for supporting work roll chocks and conveyors, roller type bearings were found to fail very rapidly from the lack of lubrication, presence of water or moisture, and the impact loads to which the bearings were subjected, as when a crane lowers a work roll chock onto guide tracks.

Accordingly, a definite need exists for a strong bearing of inherently low friction, which will function with little or no lubrication, and which is corrosion resistant to withstand a wet environment.

Hardened steel plain bearings have been recognized as satisfactory under heavy loads at low rotational speeds, but they have been unable to function without failure under such adverse conditions as outlined above. The same is also true of bronze bearings, stainless steel, and carburized alloy steel bearings, all of which have been tried with wheel and axle combinations for steel mill work roll chocks, but have suffered early failure.

SUMMARY OF THE INVENTION

The present invention provides a new and improved hardened steel plain bearing and bearing-supported member that, as an assembly, is capable of withstanding high loads, including impact loads, and has low friction and corrosion-resistant bearing surfaces. Because of these characteristics, the improved bearing construction is ideally suited for use in heavy industrial equipment such as conveyors, truck wheels of the type on which steel mill work roll chocks are supported, and other low-speed, high-load uses, and especially in environments where water or moisture is prevalent and bearing lubrication is often neglected or ineffective. The invention may be readily embodied, for example, in the form of a wheel rotatable on a fixed axle or in the form of a bearing block in which a journal or wheel axle is rotatable.

The bearing and bearing-supported rotatable member are fabricated of steel. In the preferred embodiment, the steel is medium carbon alloy steel. The bearing surfaces of the bearing and rotatable part, i.e., the surfaces between which the relative sliding occurs, are nitrided to produce a hardened case and are steam tempered to produce a corrosion-resistant, low friction, oxide surface. The high strength of the nitrided case serves to rigidly and adequately support the oxide layer against deformation under high loads, including impact loads. The outside layer, which might be characterized as ceramic-like, is relatively brittle, and the hardened case tends to prevent this brittle surface from rupturing or spalling when subjected to high loads, including impact loads.

By virtue of the surface characteristics on the hardened case, provided by the steam tempering, the bearing is adequately free-running with little or no lubricant at low speeds and under high loads. Because the surface is highly resistant to corrosion, it retains its low friction character even under adverse conditions, such as conditions in which the bearing is subjected to moisture or water. Also, by virtue of the corrosion-resistance of the surface, water, which normally is deleterious to a lubricated bearing, can in fact act as a lubricant in this bearing and enhance its performance under what would otherwise be considered adverse conditions.

From the above it will be apparent that an object of this invention is to provide a new and improved plain bearing that will function well and provide long service under heavy load and low speed conditions, in environments that are normally deleterious to bearings, i.e., wet, industrial, conditions and where bearing lubrication is inadequate.

Other objects, features and advantages will become more apparent and better understood from the detailed description of a preferred embodiment that follows.

BRIEF DESCRIPTION OF THE DRAWING

The drawing is a side elevational view, with parts in section, of a fixed axle and a rotatable wheel embodying the present invention.

DETAILED DESCRIPTION OF A PREFERRED EMBODIMENT

While the present invention may be embodied in different forms of a plain bearing and bearing-supported member, it is exemplified by the plain radial bearing structure of a wheel and axle assembly 10, as shown in the drawing. The assembly 10 includes an axle 12 and a relatively rotatable wheel 14, and is one of two wheel and axle assemblies that support each bottom work roll chock of a pair of top and bottom work rolls used in a steel mill. The wheel and axle assemblies facilitate movement of the chocks and roll pair along tracks when the rolls are pulled from a roll stand.

The axle 12 includes a support portion 12a and a slightly larger diameter bearing portion 12b, which terminates in a wheel retaining flange 16 at what is the outboard end of the axle when mounted to a truck or other support. In this embodiment, the axle is adapted to be supported in a stationary manner, i.e., fixed against rotation relative to its support. One suitable mounting arrangement is drawn in phantom, where an axle holding washer 20 securable to a chock or other support member is tack welded to the axle at 19. A circumferential lubrication groove 22 is located approximately midway along the axial length of the bearing portion 12b and can receive lubricant through a central axial bore 24 and two diametrically opposite radial bores 26. The axial bore 24 terminates at its outer end in a recessed grease fitting 28. Although an important feature of this bearing is its ability to function in the absence of lubrication, the lubrication groove facilitates use of lubricant where good maintenance and favorable environment are available.

The wheel 14 in the embodiment shown is flanged, as at 32, and has a cylindrical central bore 34 surrounding and supported for rotation by the bearing portion 12b of the axle 12. A counterbore 36 in a front or outside face 38 of the wheel 14 receives the retaining flange 16 and provides a radial shoulder 40 that cooperates with the flange 16. The surface of the central bore 34 slides during rotation of the wheel on the surface of bearing portion 12b of the axle and hence forms what is known as a plain bearing.

The bearing and bearing-supported member that comprise this invention are made of steel, e.g., bar stock or forgings. A medium carbon alloy steel is especially suitable, such as AISI 4140 or 4150 steel.

The surface of portion 12b and the surface of the bore 34, i.e., the bearing surfaces, are ground smooth to approximately a 32 microinch finish. The axle 12 and wheels 14 are then heat treated and conditioned as normally required for nitriding and thereafter processed to caseharden the parts by forming nitrides in a surface layer or zone known as the "case." While the significant area of nitriding from the standpoint of this invention is the bearing surfaces, in practice the entire surface of the parts are nitrided. This processing, or so-called "nitriding" can be accomplished by any of the known commercial nitriding processes, such as the Floe process of nitriding (U.S. Pat. No. 2,437,249), Ni-tempering, a nitriding process developed by the Ipsen Company, Rockford, Ill., or Tufftriding, a molten salt process of the Kolene Corporation, Detroit, Mich. Aternatively, the casehardening can be limited to the bearing surfaces by selectively preventing nitriding of other areas through the use of commercial coatings for the purpose. The depth to which the case is hardened on the parts may vary somewhat for different applications, but will generally be typical of the depth to which nitrided parts are commonly casehardened for increased strength, for example, a diffused case depth of between 0.005 to 0.020 inch.

Following the casehardening by nitriding, the bearing surfaces, i.e., the surface of the axle part 12b and the bore 34 of the wheel 14 are steam tempered, to produce an oxide surface layer that is highly corrosion-resistant, hard, and has a lower coefficient of friction than the surface prior to steam tempering. As with the nitriding, the steam tempering of the bearing surfaces will typically include steam tempering of all surfaces, but may be limited to selected surfaces if desired.

Steam tempering, as referred to herein, is a method of steam treating that incorporates tempering. The treatment per se is known in the art and typically is accomplished in a furnace in which the steel parts are heated in the presence of steam to a temperature of about 900° F. to 1150° F., held at that temperature for an hour or more, and then cooled to approximately 550° F. The parts are then quenched, preferably in soluble oil, although this is optional.

The combination of the two treatments, i.e., the nitriding and the steam tempering, of the bearing surfaces of the parts produces a novel plain bearing and bearing-supported member with a low-friction, brittle, corrosion-resistant, oxide surface supported by a strengthened case that inhibits rupturing or spalling of the oxide surface under heavy loads, including impact loads.

EXAMPLE

By way of example only and not by way of limitation, four wheel and axle assemblies of the construction illustrated in the drawing and described above, for use with two work roll chocks for a steel finishing mill were fabricated. Each axle portion 12a formed a plain bearing for the associated wheel 14 and was received within the bore 34. The axle length was approximately 8.5 inches, and the diameter of the bearing portion 12b was approximately 3.5 inches. The axial length of the bearing portion 12b was approximately 3.0 inches. The wheel 14 had an outside flange diameter of approximately 7 and ⅞ inch. The diameter of the bore 34 was such as to establish a bearing clearance of 0.006 to 0.008 inch. The axle and wheel were machined from solid bar stock of AISI 4140 medium carbon alloy steel and the surface of the bearing portion 12b and the bore 34 were ground to a 32 microinch finish. The parts 12 and 14 were heat treated and then case-hardened by the formation of nitrides, i.e., nitrogen compounds of the iron and alloying metals of the steel parts, by a commercial process known as "Ni-tempering," producing a diffused nitrided case depth of between 0.005 and 0.020 inch. The surfaces of the nitrided parts were then steam tempered by a commercial steam tempering process, including a subsequent quench in soluble oil. This included heating the parts in a furnace in the presence of steam to a temperature of approximately 1000° F., holding the parts at such a temperature for approximately 1½ hours, and then cooling the parts in the presence of steam at a temperature of about 550° F. The four axles and wheels were then assembled and were fastened to two bottom chocks that supported a pair of steel finishing mill work rolls. The total weight supported by the four wheels was approximately 25 tons. The wheels and axles exceeded a basic dynamic capacity design load of 50,700 pounds. The wheel and axle assemblies were tested in actual working conditions, in which they were subjected to heavy loads as well as impact loads, a wet environment and inadequate lubrication. The parts functioned satisfactorily without failure.

By comparison, similarly constructed parts fabricated with bronze bearings, plain bearings of hardened steel, stainless steel plain bearings, carburized alloy steel bearings, and alloy wheel forgings, all failed in actual use within three months. Parts produced as set forth in this example, tested for several times the period of failure of the comparison parts functioned and performed satisfactorily without failure.

While a preferred embodiment of this invention has been described in detail, it will be appreciated that various modifications and alterations may be made therein without departing from the spirit and scope of the invention set forth in the appended claims.

What is claimed is:

1. A plain bearing assembly comprised of a steel bearing member and a steel rotatable member in sliding contact with the bearing member, said assembly constructed to operate at low speed and under heavy load with little or no lubrication, each said plain bearing member having a surface of revolution that slidingly engages a surface of revolution of the other for relative rotation, each said surface of revolution having an oxide surface layer on a nitrided case, said oxide layer of each member being formed by steam tempering said surfaces of revolution of the members subsequent to nitriding.

2. A plain bearing comprising:

inner and outer relatively sliding members, each of carbon alloy steel with a smooth surface finish on opposed relatively sliding surfaces; each having a strengthened case or layer adjacent said sliding surface, hardened and containing nitrides to a diffused depth of between 0.005 and 0.020 inch; and a brittle, corrosion-resistant, oxide, surface on the strengthened case, forming said sliding surfaces.

3. A plain bearing comprising:

a journal and journal bearing relatively rotatable, each of carbon alloy steel with a smooth surface finish on opposed relatively sliding surfaces; each having a strengthened case or layer adjacent said sliding surface, hardened and containing nitrides to a diffused depth of between 0.005 and 0.020 inch; and a brittle, corrosion-resistant, oxide, surface on the strengthened case, forming said sliding surfaces.

* * * * *